Patented Nov. 25, 1952

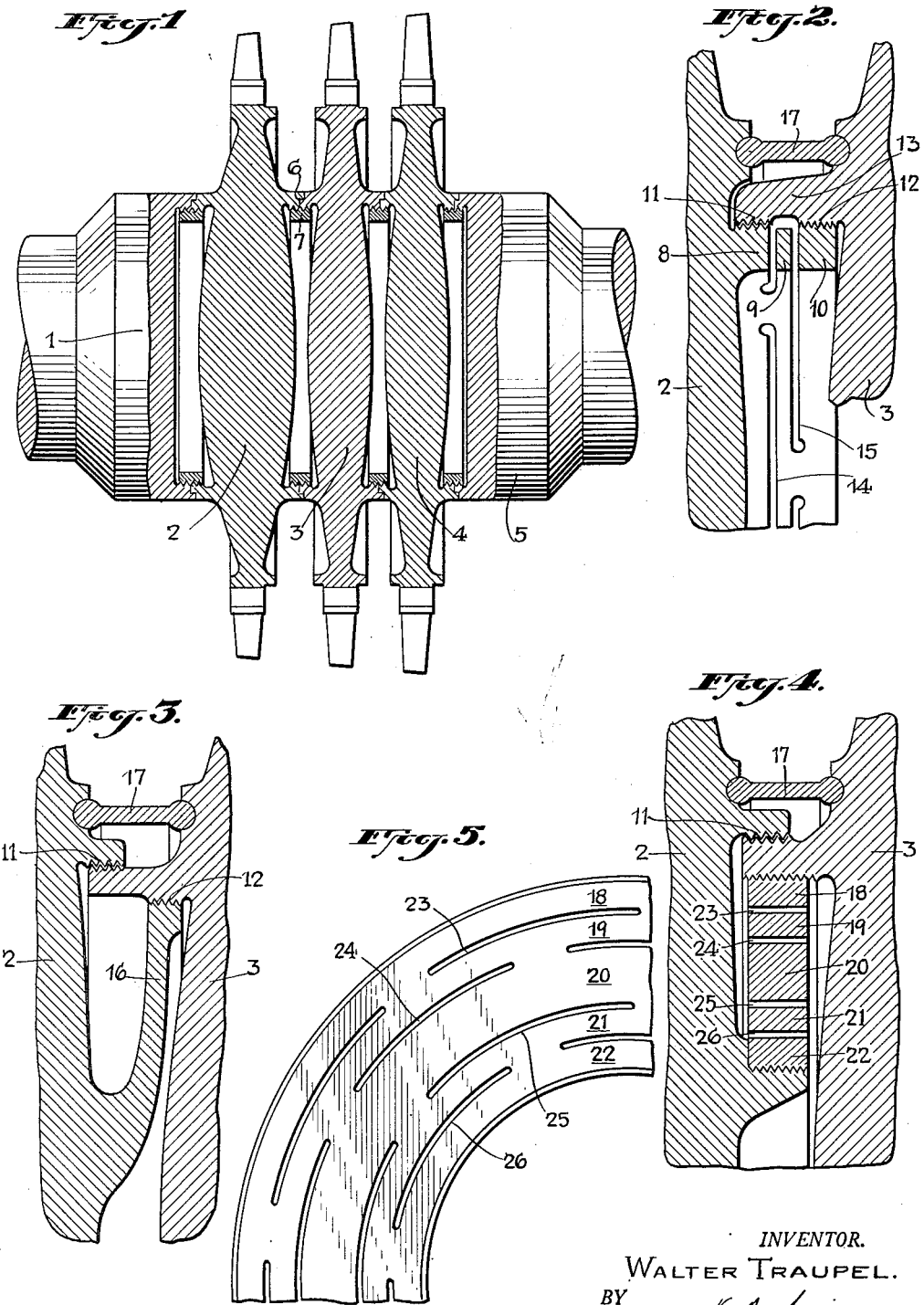

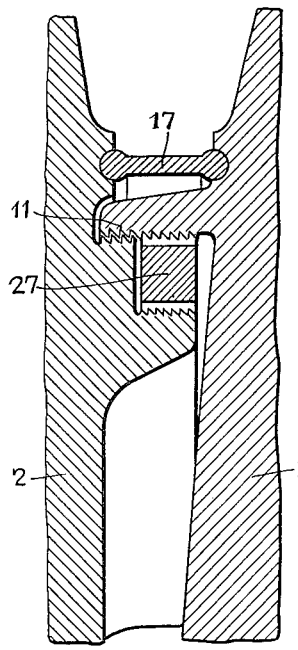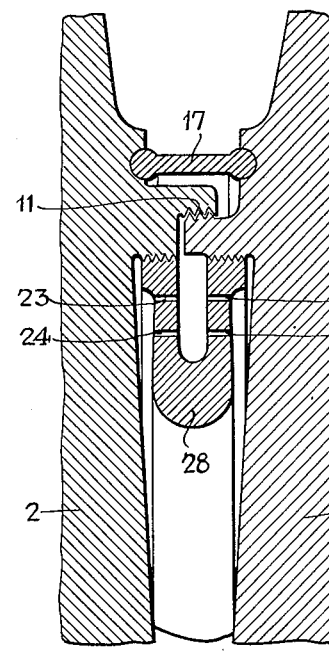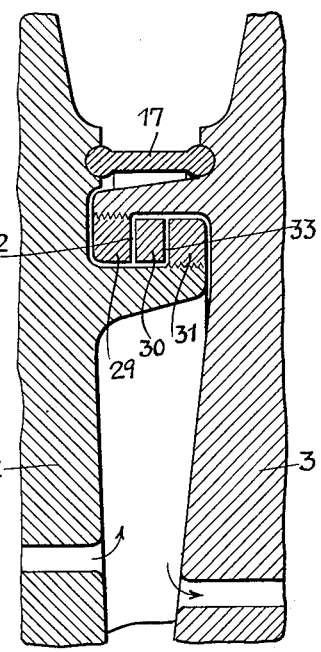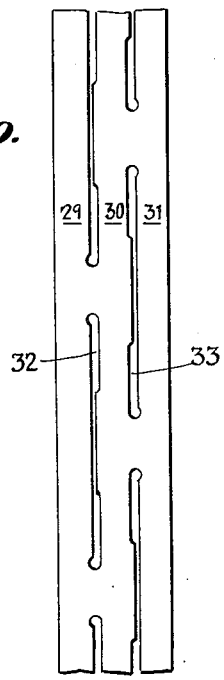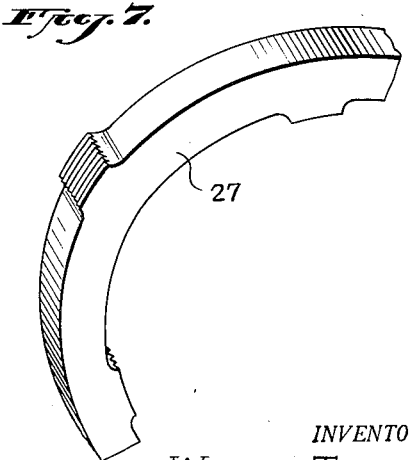

2,619,317

UNITED STATES PATENT OFFICE 2,619,317

ROTOR FOR TURBOMACHINES

Walter Traupel, Winterthur, Switzerland, assignor to Sulzer Frères, Société Anonyme, Winterthur, Switzerland Application August 4, 1948, Serial No. 42,480
In Switzerland August 7, 1947

21 Claims. (Cl. 253—39.15)

1

This invention relates to rotors for turbomachines, more particularly but not exclusively gas turbines, which are built up of several pieces arranged side by side in the axial direction.

In such rotors which have hitherto been proposed the connections joining together the rotor pieces have not been altogether satisfactory, in that they have tended to come loose in service due to differences in expansion arising from the considerable differences in temperature and fluctuations in temperature which occur. It is an object of the present invention to provide a connection which reduces or eliminates this disadvantage, and which, in certain cases, may reduce the heat flow through the connection from one rotor piece to another.

According to the present invention a rotor for a rotary machine is built up of several pieces arranged side by side in the axial direction, and at least two adjacent pieces are joined together by a connection which is so constructed that its elasticity is enhanced at least in the axial direction.

Preferably the construction of the connection for enhancing its elasticity also serves to decrease the density of the heat current which can flow through the connection from one rotor piece to the other.

The invention may be carried into effect in various ways, and several specific embodiments will be described by way of example with reference to the accompanying drawings. A rotor having a connection of the kind which has hitherto been employed is also illustrated.

In the drawings:

Figure 1 is a longitudinal cross-section of a rotor of known construction,

Figures 2 and 3 are fragmentary cross-sections of constructions embodying the invention in which the connection is an integral part of the rotor pieces.

Figures 4 and 5 are two views of a construction embodying the invention in which a connection with an intermediate piece is employed.

Figures 6 and 7 illustrate another construction employing an intermediate piece.

Figure 8 illustrates a further construction employing an intermediate piece, and Figures 9 and 10 illustrate yet another such construction, in which the intermediate piece is held in compression.

Figure 1 shows a rotor of known construction for a rotary machine, which is sub-divided transversely to the axis of rotation and consists of several pieces, namely, the wheels 2 to 4 and the shaft ends 1 and 5. Adjacent pieces, e. g., the pieces 2 and 3, are drawn together by a connection 6, 7.

A connection of the kind shown, which is permissible for many rotary machines, has proved to be unsuitable for certain rotary machines, for instance gas turbines, in which the rotor is subjected to high temperatures and strong heat currents.

The great temperature differences which exist between adjacent pieces of the rotor give rise to considerable differences in the expansions of these pieces, and moreover the strong heat currents which flow through the connection between the pieces produce large temperature gradients in the connection, which is already highly stressed by mechanical forces. In addition jumps in temperature occur at the areas of contact between the connection and the rotor pieces, which give rise to undesirable local expansions.

The natural elasticity of the connection 6, 7 may not be sufficient to be able properly to accommodate these relative expansions, so that the elastic limit of the material may be exceeded, and there may be some relative movement at the contact areas between the connection and the rotor pieces.

These conditions, which change at every fluctuation in operation of the rotary machine, may very soon lead to the loosening of the connection.

In order to reduce or eliminate these disadvantages a connection of enhanced elasticity, in accordance with the present invention, may be adopted, as shown in Figure 2. In this arrangement the rotor piece 2 carries an annular flange 8, 9, 10 which is threaded outside at 11 and 12; these threads can be cut in one operation. This flange is directly screwed into a corresponding flange 13 which extends from the rotor piece 3. This flange is internally threaded at 11 and 12; these threads can also be cut in one operation.

The thread 11 is cut with a slacker fit than the thread 12, so that external and internal threads 11 merely act as overlapping safety stops to prevent over-stressing of the connection. As shown in the drawing the connection is not yet in a tightly screwed condition, for which reason the clearance of the thread 11 appears to be equal on both sides.

The elasticity of the flange 8, 9, 10 is enhanced at least in axial direction by the provision of a number of arcuate slits 14 and 15, which are periodically distributed around the circumference. These slits are arranged in two rows and overlap each other and are displaced by nearly half the period. The two rows of slits divide the flange into three parts, which act in the following way.

The part 8 is integral with the rotor piece 2 over its whole circumference and its consequent rigidity renders it suitable for carrying the thread 11 serving as a safety stop.

The part 10 is a ring which, as will be described, is firmly secured to the internal thread 12 of the flange 13.

The part 9 is also a ring, which is connected with the parts 8 and 10 in such a way that it forms in effect a series of beams arranged circumferentially. These beams permit the part 10 to move elastically in the axial direction with respect to the part 8. They also allow it to undergo slight elastic changes in diameter, to be slightly distorted out of round, to be slightly inclined in relation to the part 8. Nevertheless these beams do not allow the part 10 to be moved out of centre with respect to the part 8, so that the connection 8, 9, 10 can serve to centre the rotor pieces 2 and 3. However, it is advisable to provide other means for this purpose, and to this end a special centering and spacing ring 17 is provided which has a bulbous rim at each side. These rims fit into corresponding annular grooves in the rotor pieces 2 and 3. This spacing ring 17 also protects the connection against hot gases, which otherwise could reach the interior of the connection through the clearance of the thread 11 and through the slits 14 and 15.

If the connection, which is shown in a loose condition in Figure 2 is tightly screwed up, the part 10 moves elastically away from the part 8 until the thread 11 fits, whereby further tightening and consequent overloading of the part 9 is prevented.

Thus in the operation of the rotor the thread 12 is always held under an initial tension by the part 9. The thread of the part 10 is able to follow all deformations of the rotor piece 3 but on the other hand the deformations of the rotor piece 2 of the rotor are unable to influence the part 10 and its thread. Furthermore, the heat current flowing through the connection is throttled by the slots 14 and 15, so that the density of the heat current flowing through the contact areas of the thread 12 is decreased. For the purpose of further decreasing this heat current it is advisable to arrange that the parts of the connection with the smaller diameter, that is the parts 8, 9 and 10, should engage with the hotter of the two pieces of the rotor.

All these factors assist the thread 12 to maintain in operation the elastic initial tension which is imparted to it during assembly, so that it does not loosen. The magnitude of this initial tension should be such that it is sufficient securely to hold together the rotor pieces in all normal operation, and for which reason the loosening of the thread 11, which will occur after a short operating time, is harmless. If, however, there is a mishap during operation, e. g., breakage of a turbine blade, the thread 11, at least on parts of its circumference, will engage again and so fulfil its function by acting as an overlapping stop and thus preventing an overloading of the elastic connection.

Instead of simply giving the thread 11 a greater clearance than the thread 12, as described, the function of the thread 11, namely to serve as overlapping safety stop, can be attained by suitably adapting other properties of the threads 11, for example, by adapting the profile of the thread, the pitch, or the position of the pitch.

Figure 3 shows another form of connection in which the rotor pieces 2 and 3 are also directly screwed to each other. One part of the thread 12 is, however, formed on a disc-like flange 16 of the rotor piece 2, which flange is of enhanced elasticity by virtue of its disc-like shape. The thread 11 serves as an overlapping safety stop.

Figure 4 shows a further form of connection, in which the rotor pieces 2 and 3 are indirectly screwed together by an intermediate piece. This intermediate piece 18 to 22 consists of an annular disc with a relatively large outer and relatively small interior thread. When screwed home it is slightly dished or elastically deformed in the axial sense by the axial thread forces. The result of this deformation with a solid disc would mean that its exterior and its interior thread would lose their cylindrical form and become slightly conical so that they would engage properly only on about one thread. In order to avoid this, the intermediate piece 18 to 22, which is stressed by the axial forces transmitted by the connection, is provided with at least two rows of arcuate slits 23 to 26, which slits are distributed periodically around the circumference and overlap each other, and are displaced by rather less than half the period. In this way the axial elasticity of the connection is enhanced.

Figure 5 shows a portion of this intermediate piece seen in axial direction. Only the annular portion 20 is subjected to any appreciable dishing by the axial thread forces. The annular portions 19 and 21 each constitute a series of beams arranged circumferentially, which are elastically deformed by bending as well as by torsion and which to a great extent prevent dishing of the annular portions 18 and 22 carrying the external and internal threads. These annular portions have also an enhanced radial elasticity and can therefore fit the threads of the rotor pieces 2 and 3 particularly well. Finally, the slits 23 to 26 serve to decrease the density of the heat current flowing through the connection. The thread 11 again serves as an overlapping safety stop, and a spacing and centering ring 17 is provided as in the other examples.

Figure 6 shows another form of connection in which the rotor pieces 2 and 3 are indirectly screwed together by an intermediate piece. This intermediate piece 27 consists of a ring provided on the outside and inside with saw-tooth threads which are periodically interrupted for considerable distances around the circumference, as shown in Figure 7. The exterior and interior interruptions overlap each other, and are displaced by nearly half the period. The ring 27 thus constitutes a series of beams arranged circumferentially. These beams are elastically deformable in both the axial and radial directions, by bending and, to a smaller extent, by dishing. The saw-tooth form of the thread excludes the harmful results which the dishing would have on threads of other forms. The thread 11 again serves as an overlapping safety stop and a spacing and centering ring 17 is again provided.

Figure 8 shows a further form of connection in which the rotor pieces 2 and 3 are indirectly screwed together by an intermediate piece. This intermediate piece 28 consists of a ring which is deeply grooved from the outside, and by this means its elasticity in the axial direction is enhanced. The thread 11 again serves as an overlapping safety stop and a spacing and centering ring 17 is again provided. Rows of arcuate slits 23 and 24 can also be provided as a modification, these slits being similar to those shown in Figures 4 and 5.

Figure 9 shows yet another form of connection in which the rotor pieces 2 and 3 are indirectly screwed together by an intermediate piece. This intermediate piece consists of a ring 29, 30 and 31. The threads of the two rotor pieces 2 and 3 are so arranged that when the rotor pieces are drawn together the thread of the left hand rotor piece 2 lies to the right of the thread of the right hand rotor piece 3, so that the ring 29, 30 and 31 is stressed in compression by the axial forces transmitted through the threads. The ring is provided with at least two rows 32 and 33 of slits, which are periodically distributed around the circumference and overlap each other and are displaced by nearly half the period. The slits, somewhat according to the development shown in Figure 10, are so shaped and dimensioned that even if they should be closed up in the axial direction the elastic limit of the material of the ring would not be exceeded. A special overlapping safety stop, such as the thread 11 of Figures 2 to 4, 6 and 8 is therefore unnecessary in this case.

Threads of saw-tooth form which are used in the constructions shown in Figures 6 and 7 can also be used in other constructions.

The connection can be exposed to a cooling air or gas current, which for example, is conducted according to the arrows shown in Figure 9.

I claim:

1. A rotor for a turbo-machine, comprising a plurality of bladed disc members, means for individually interconnecting said disc members, said means comprising spacing means interposed between each two disc members for spacing same in axial direction, and means disposed between each two disc members for contracting the disc members against said spacing means, said contracting means being disposed radially inside and spaced from said spacing means and including means rendering same resilient in the direction of the rotor axis.

2. A rotor as defined in claim 1, said contracting means being resistant to heat flow.

3. A rotor for a turbo-machine, comprising a plurality of bladed disc members having a solid center, means for individually interconnecting said disc members, said means comprising spacing means interposed between neighboring disc members for spacing same in axial direction, means disposed between each two disc members and axially contracting the neighboring disc members against said spacing means, and individual resilient means interposed in said contracting means and being more resilient than said spacing means for resiliently forcing said disc members against said spacing means.

4. A rotor for a turbo-machine, comprising a plurality of bladed disc members having a solid center, means for individually interconnecting said disc members, said means comprising spacing means interposed between two neighboring disc members for spacing same in axial direction, and means disposed between each two disc members and contracting two neighboring disc members against said spacing means, said contracting means comprising resilient means for resiliently contracting said disc members against said spacing means.

5. A rotor as defined in claim 4, said resilient means being resistant to heat flow to reduce the flow of heat between the two neighboring disc members to which they pertain.

6. A rotor for a turbo-machine, comprising a plurality of bladed disc members having a solid center, means for individually interconnecting said disc members, said means comprising spacing means interposed between two neighboring disc members for spacing same in the direction of the rotor axis, one of two neighboring disc members having an internally threaded portion and the other of the two neighboring disc members having an externally threaded portion screwed into said internally threaded portion, at least one of said portions being more resilient than said spacing means for resiliently pressing said disc members against said spacing means upon tightening of said threaded portions.

7. A rotor for a turbo-machine, comprising a plurality of bladed disc members and means for interconnecting said disc members, said means comprising spacing means interposed between two neighboring disc members for spacing same in the direction of the rotor axis, one of two neighboring disc members having an internally threaded portion, the other of the two neighboring disc members having an externally threaded portion, and an intermediate member having an external thread screwed into said internally threaded portion and having an internal thread screwed into said externally threaded portion and being resilient at least in the direction of the rotation axis of the rotor for resiliently pressing the neighboring disc members against said spacing means upon tightening of said threads.

8. A rotor as defined in claim 7, said intermediate member being in the shape of a ring.

9. A rotor as set forth in claim 8, said ring having concentric overlapping slits.

10. A rotor as set forth in claim 8, said ring having substantially parallel, overlapping, radial slits.

11. A rotor as set forth in claim 8, said ring having substantially parallel, overlapping, radial slits, said slits having narrow and wide portions.

12. A rotor for a turbo-machine, comprising a plurality of bladed disc members, spacing means interposed between two neighboring disc members for spacing same in the direction of the rotation axis of the rotor, one of the two neighboring disc members having an internally threaded portion, the other of the two neighboring disc members having an externally threaded portion substantially concentric with said internally threaded portion, a substantially annular member having externally threaded portions spaced about its circumference and screwed into the internally threaded portion of one of the neighboring disc members and having internally threaded portions interspersed between said externally threaded portions and screwed over the externally threaded portion of the other neighboring disc member, for forcing the neighboring disc members against said spacing means upon tightening of said threads.

13. A rotor as defined in claim 12, the threads of said threaded portions having saw-tooth configuration.

14. A rotor for a turbo-machine, comprising a plurality of bladed disc members, spacing means interposed between two neighboring disc members for spacing same in the direction of the rotation axis of the rotor, each of the two neighboring disc members having a part with an end portion axially overlapping the end portion of the part of the neighboring disc member, one of said end portions having an external thread and the other end portion having an internal thread, and an annular member having an internal thread screwed over said external thread and having an external thread screwed into said internal thread for pressing the neighboring disc members against said spacing means upon tightening of said threads.

15. A rotor as defined in claim 12, said annular member being resilient.

16. A rotor for a turbo-machine, comprising a plurality of bladed disc members and means for interconnecting said disc members, said means comprising spacing means interposed between two neighboring disc members for spacing same in the direction of the rotor axis, one of two neighboring disc members having an internally threaded portion, the other of the two neighboring disc members having an externally threaded portion, and axially resilient ring means interposed between said threaded portions and having an external thread screwed into said internally threaded portion and having an internal thread screwed over said externally threaded portion.

17. A rotor for a turbo-machine, comprising a plurality of bladed disc members and means for interconnecting said disc members, said means comprising spacing means interposed between two neighboring disc members for spacing same in the direction of the rotor axis, each of two neighboring disc members having a threaded portion disposed radially inside and spaced from said spacing means, and a resilient intermediate member having threads engaging and interconnecting said threaded portions.

18. A rotor for a turbo-machine, comprising, in combination, a plurality of bladed disc members, spacing means interposed between two neighboring disc members for spacing same in the direction of the rotation axis of the rotor, and individual resilient contracting means interposed between two neighboring disc members for contracting the two neighboring disc members against said spacing means, said contracting means comprising stop means limiting axial deformation of said contracting means.

19. A rotor for a turbo-machine, comprising, in combination, a plurality of bladed disc members having a solid center, spacing means interposed between two neighboring disc members for spacing same in the direction of the rotation axis of the rotor, individual contracting means interposed between two neighboring disc members and including resilient means for resiliently contracting the two neighboring disc members against said spacing means, and cooling medium supply means in said disc members for conducting a stream of cooling medium to said contracting means.

20. A rotor for a turbo-machine, comprising, in combination, a plurality of bladed disc members, spacing means interposed between two neighboring disc members for spacing same in the direction of the rotation axis of the rotor, said disc members comprising threaded portions, and resilient contracting means comprising threaded portions screwed on the threaded portions of said disc members and resiliently pressing the two neighboring disc members against said spacing means upon tighting of said threaded portions, the threads of said threaded portions having sawtooth configuration.

21. A rotor for a turbo-machine, comprising, in combination, a plurality of bladed disc members, spacing means interposed between two neighboring disc members for spacing same in the direction of the rotation axis of the rotor, and individual contracting means comprising resilient means and being interposed between two neighboring disc members for resiliently contracting the neighboring disc members against said spacing means, said resilient means comprising stop means limiting the axial deformation thereof.

WALTER TRAUPEL.

REFERENCES CITED

The following references are of record in the file of this patent:

UNITED STATES PATENTS

| Number | Name | Date |
|---|---|---|
| 1,175,460 | Leblanc | Mar. 14, 1916 |
| 1,326,870 | Junggren | Dec. 30, 1919 |
| 2,369,051 | Huber | Feb. 6, 1945 |
| 2,427,614 | Meier | Sept. 16, 1947 |
| 2,461,402 | Whitehead | Feb. 8, 1949 |
| 2,479,046 | Ledwith | Aug. 16, 1949 |

FOREIGN PATENTS

| Number | Country | Date |
|---|---|---|
| 103,746 | Sweden | Feb. 17, 1942 |
| 225,640 | Switzerland | Feb. 15, 1943 |
| 343,462 | Germany | Nov. 2, 1921 |
| 352,282 | Germany | Apr. 20, 1919 |
| 648,174 | France | Aug. 7, 1928 |